United States Patent Office

2,874,124
ANTI-SOIL REDEPOSITION AGENTS

Emil A. Vitalis, Springdale, Conn., assignor to American Cyanamid Company, New York, N. Y., a corporation of Maine No Drawing. Application June 10, 1955
Serial No. 514,773

6 Claims. (Cl. 252—110)

This invention relates to the use of polymerization products of N-vinyl-2-oxazolidone, and particularly polyvinyloxazolidone, as soil redeposition inhibitors to prevent the redeposition of soil onto fabrics, clothes and the like, during washing, shampooing, laundering and dry cleaning.

N-vinyl-2-oxazolidone possesses the following structural formula

I

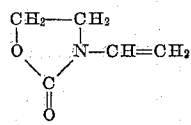

and the compound, itself, as well as its polymerization products, including homopolymers and copolymers (or interpolymers), as well as graft polymers are known and more fully described in copending patent applications Serial Numbers 430,740 and 481,711, filed May 18, 1954, and January 13, 1955, respectively, now Patent No. 2,818,362 and Patent No. 2,818,399, issued Dec. 31, 1957.

It has now been discovered that such polymerization products of N-vinyl-2-oxazolidone, and particularly polyvinyloxazolidone, possess excellent properties as soil redeposition inhibitors and may be used as additives to cleansing agents such as soaps, synthetic detergents, dry cleaning agents, shampoos and the like to prevent the redeposition of soil or dirt onto fabrics, clothes and similar materials during washing, laundering, dry cleaning and similar operations.

In order that those skilled in the art may better understand how the present invention can be carried into effect, the following examples of preparations of compounds of the present invention are given by way of illustration and not by way of limitation. All parts and percentages are by weight.

EXAMPLE 1

This example illustrates one suitable method of preparing N-vinyl-2-oxazolidone.

A. *Preparation of N-(β-hydroxyethyl)-2-oxazolidone*

The above intermediate is prepared by reaction of equal molar proportions of diethanolamine and diethyl carbonate, which reaction may be illustrated by the following equation:

II

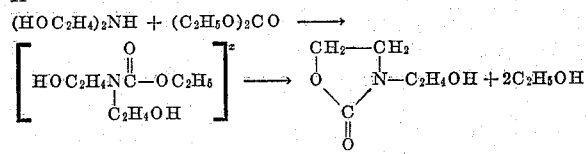

x intermediate not isolated

| | Grams |
|---|---|
| Diethanolamine | 420 |
| Diethyl carbonate | 472 |

To a reaction vessel fitted with a stirrer, thermometer, and a 10-inch Carborundum-packed column, which in turn is fitted with a variable take-off head, is charged 315 grams (3 moles) of diethanolamine and 354 grams (3 moles) of diethyl carbonate. The vessel is heated with a Glas-Col mantle and, when the pot temperature reaches 122° C., refluxing starts. The take-off rate is then adjusted to maintain a pot temperature of 110–120° C. After two hours enough ethanol has been liberated so that the additional mole of each component can be added. The reaction is then continued, maintaining a close check on the pot temperature. Throughout the reaction the take-off temperature is about 78.4° C. As the reaction approaches 75% of completion, the pot temperature gradually rises and, at 135° C., 84% of the theoretical amount of alcohol has been removed. The set-up is then altered to provide for vacuum distillation, and enough additional ethanol is removed at 90–105° C./100 mm. to provide for 95% reaction. The pressure is then gradually lowered to 10 mm. (aspirator), and the temperature is gradually raised to 135° C. (no higher). The product at this stage is a slightly hazy, light-colored mobile liquid. It is treated with decolorizing carbon and filtered hot. The yield of essentially colorless liquid, $n_D^{25}=1.4825$, is 513 g. (theory=524 g. or 98.0%). The compound boils at 162° C. at 1 mm. pressure; infrared curve, E-4923.

| Analytical | Percent C | Percent H | Percent N | Hydroxy value |
|---|---|---|---|---|
| Calculated for $C_5H_9O_3N$ | 45.79 | 6.92 | 10.68 | 429.0 |
| Found | 45.81 | 6.89 | 10.84 | 428.7 |

B. *Preparation of N-(β-chloroethyl)-2-oxazolidone*

The above intermediate is prepared from N-(β-hydroxyethyl)-2-oxazolidone by a reaction which may be illustrated by the following equation:

III

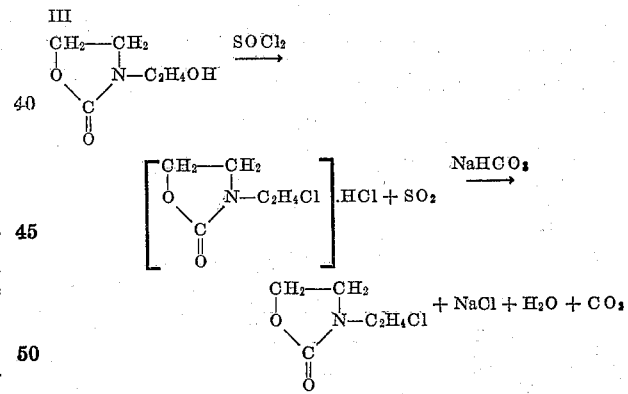

| | Grams |
|---|---|
| N-(β-hydroethyl)-2-oxazolidone (crude) | 262 |
| Thionyl chloride | 238 |
| Benzene (400 ml.) | 352 |
| Sodium bicarbonate | 168 |

The N-(β-hydroxyethyl)-2-oxazolidone is charged to a suitable reaction vessel fitted with a thermometer, stirrer and Friederichs condenser. One-half (176 g.) of the benzene is added and, after a short interval of rapid stirring, a crude dispersion is obtained (the liquids are non-miscible). The previously weighed thionyl chloride is then added slowly over a three-hour period. Initially there is a slight exotherm, but once the evolution of gas has begun the temperature is easily held at 30° C. ±5° C. A strong hood is required to take care of the acidic gases that are evolved.

After approximately one-half the thionyl chloride has been added, the reaction clears, becomes homogeneous and has a light-amber color. At the end of the addition period a slow, steady stream of nitrogen is passed through the slowly stirred reaction mixture and continued for about 16 hours. During this time the reaction mixture darkens slightly and some loss of volume is noted.

The remainder (176 g.) of benzene is then added, and 168 g. NaHCO₃ is weighed out and added slowly to the reaction mixture over a 3-hour period. Initially there is a vigorous evolution of gas ($CO_2$) but allowance has been made for adequate "free-board" in the chosen reaction vessel employed. Moderate stirring is maintained throughout this neutralization, but after 7 hours there is still a slight evolution of $CO_2$. The reaction mass is again stirred for about 16 hours to insure complete removal of all free and loosely bound HCl.

At the end of this period the reaction mass is filtered, and the solid is then re-slurried in 300 ml. benzene for 15 minutes and refiltered. The combined filtrates are then treated with decolorizing carbon and again filtered. On vacuum distillation considerable water comes over with the initial benzene (water of reaction); at the same time the product acquires a slight haze. Consequently, after thorough drying, the solution being concentrated is refiltered and stripped of solvent at <50° C. (aspirator), and then finally up to 90° C. at 7 mm. for 1 hour. The product is a light, amber-colored mobile liquid; the yield is 241 g. (theory=299 g. or 80.6%); $n_D^{25}$ 1.4890. This chloro compound is used "as is" in the following dehydrochlorination step. However, the material can ben readily distilled, B. P. 100° C./0.1 mm.; $n_D^{25}$ 1.4900; infrared curve E-5127.

| Analytical | Percent C | Percent H | Percent N | Percent Cl* |
|---|---|---|---|---|
| Calculated for C₅H₈O₂NCl | 40.15 | 5.39 | 9.37 | 23.70 |
| Found | 39.48 | 5.45 | 9.46 | 24.81 |
|  | 39.22 | 5.61 |  | 24.65 |

* Excess Cl corresponds to C₅H₈O₂NCl·0.058HCl (or 1.39% HCl).

C. Preparation of N-vinyl-2-oxazolidone

N-vinyl-2-oxazolidone is prepared from N-(β-chloroethyl)-2-oxazolidone by a reaction that may be illustrated by the following equation:

IV
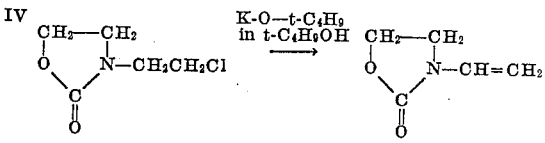

| | Grams | Moles |
|---|---|---|
| Potassium (metal) | 40 | 1.02 |
| t-Butanol | 552 (700 ml.) |  |
| N-(β-chloroethyl)-2-oxazolidone | 150 | 1.002 |

Three slugs of potassium metal (16 g. each) are transferred into a beaker of toluene to remove the mineral oil. The slugs, now free of oil, are carefully weighed into a second beaker of toluene, cutting the metal to get exactly 40 g. Meanwhile 552 g. of t-butanol has been placed in a 1-liter flask fitted with thermometer and stirrer. The potassium slugs (40 g.) are now cut (under toluene) down to the size of large peas and gradually added to the t-butanol. This requires cooling at first, but warming is needed to dissolve the last traces of metal. A carefully weighed sample of the clear solution is then titrated to a phenolphthalein end point. The total solution contains 570 g.×.00171 eq./g.=0.975 equivalents

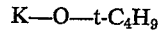

To this, 25 ml. of a previously prepared 1.14 N solution of K—O—t-C₄H₉ is added, so that the final solution contains exactly 1.00 equivalent of base.

The 1-liter reaction flask is fitted with a reflux condenser and a dropping funnel containing the carefully weighed N-(β-chloroethyl)-2-oxazolidone. The t-butanol solution is then warmed on a steam-bath to 60° C., and the addition of chloro compound is begun. Insoluble potassium chloride separates immediately and the exotherm reaction carries the temperature to reflux (85° C.). The addition is continued, maintaining gentle reflux over a 2.5-hour period. This reaction mixture is stirred gently at reflux for about 20 hours. At the end of this time a carefully weighed sample of the reaction slurry is titrated as before and the results indicate the reaction to be 88% complete.

The reaction mass is then filtered or it can be centrifuged to isolate the solid. The solid is re-slurried twice with 250 ml. benzene and again filtered and washed with additional benzene. The filtrates and washings are combined, treated with decolorizing carbon and again filtered. An additional 500 ml. benzene is now added to the essentially colorless solution and stripping of solvent begun, keeping the pot temperature below 50° C. with the help of an aspirator. During this time a pinch of hydroquinone is added as an inhibitor. The dark crude solvent-free N-vinyl-2-oxazolidone weighs 90 g. (theory=113 or 79.6%). On distillation 46 g. of product boiling sharply at 70° C./0.1 mm. is recovered. An iodine value determination (bromide-bromate method) gives a value of 201 (theory=224); this indicates a purity of 90%. Infrared curve F-5389 shows strong absorption at 1620 cm.⁻¹. A small sample of this N-vinyl-2-oxazolidone is cooled with Dry Ice. When the temperature reaches —32° C. crystallization begins and the heat of fusion carries to —15° C. Hence the melting point is about —15° C.; $n_D^{25}$ 1.4939.

EXAMPLE 2

One hundred (100) parts of N-vinyl-2-oxazolidone is allowed to stand undisturbed for several days at room temperature (20°–30° C.). The material is polymerized at the end of this period of time to a clear, solid, orange-colored mass. This polymer is soluble in water.

EXAMPLE 3

One hundred (100) parts of N-vinyl-2-oxazolidone containing 2 percent by weight of benzoyl peroxide is maintained at a temperature of 30° C. for several hours. The resulting liquid is considerably more viscous than the starting material, indicating that polymerization of the monomer has taken place.

EXAMPLE 4

To 100 parts of N-vinyl-2-oxazolidone is added 2 parts of alpha,alpha'-azodiisobutyronitrile as a polymerization catalyst. The mixture is heated to 80° C. The monomer polymerizes almost immediately to a clear, tough, tacky, orange-colored resin.

EXAMPLE 5

One hundred (100) parts of N-vinyl-2-oxazolidone is subjected to ultraviolet light for 24 hours. The resulting mass is more viscous than the starting material, indicating that polymerization has occurred. The resulting polymerization product is light clored.

The molecular weight of the polymerization products suitable for use as soil redeposition inhibitors will vary within wide limits and may be low (from about 200 to about 1600), medium (up to about 5000) and as high as about 50,000 or even 500,000. Within the more commercial aspects of the present invention, a range of from about 400 to about 20,000 has been found satisfactory. These molecular weights are determined by the microisopiestic method, where applicable in the lower molecular weight ranges, and by the osmotic pressure method, where applicable in the higher molecular weight ranges, both of which methods yield the number average molecular weight.

The amount of soil anti-redeposition agent used in any cleaning formulation will vary within wide limits and will depend to a great extent on the particular soap detergent, synthetic organic detergent or dry cleaning detergent with which it is used as well as other constituents in the complete formulation. The amount and concentration will also depend upon the nature and characteristics of the fabric or material being cleaned, the purpose for which the fabric or material is intended, the degree of cleanliness desired, etc. It has been found that from about 0.1 to about 20% by weight based on the weight of the complete formulation containing the soap detergent, synthetic organic detergent or dry cleaning detergent is usually satisfactory and that within the narrower commercial limits, from about 1 to about 15% by weight has been found preferable.

The amount of active detergent constituent of the cleaning formulation will also vary within wide limits and will depend to a great extent upon the factors noted above, particularly the purpose for which the formulation is intended. It has been found that from about 5 to about 95% of the total weight of the formulation may advantageously be the detergent constituent, with the preferred narrower commercial limits being from about 20 to about 35% by weight.

The cleaning formulation may also have added to it various other special additives such as "building agents," or fillers, including soda ash, sodium sesquicarbonate, sodium tetrapyrophosphate, sodium tripolyphosphate, sodium silicate, sodium metasilicate, borax, etc., non-alkaline inorganic salts such as sodium sulfate, sodium chloride, sodium bicarbonate, etc. scouring abrasives such as diatomaceous earth or ground pumice, bentonite, clay, etc. The amount of such special-purpose additives or "builders" will naturally vary within wide limits or may even be omitted entirely. Within the commercial ranges of the present invention, however, it has been found that amounts of from about 1% up to as high as 80% by weight (based on the formulation weight) may be added, depending particularly upon the purpose for which the formulation is intended.

The anti-soil redeposition agents of the present invention may be incorporated into (1) bar soaps for cleaning, laundering and scrubbing, (2) scouring powders for more abrasive purposes, (3) powdered or flaked soaps and synthetic organic detergents for laundry and general cleaning, (4) dry cleaning agents, (5) other synthetic detergents in liquid form, etc. As specific examples of such materials, the following are cited as illustrative but limitative: sodium or potassium soaps of the fatty acids, both saturated and unsaturated; synthetic organic detergents including: (1) the anionics such as sulfates of long-chain fatty alcohols as sodium lauryl sulfate and sodium stearyl sulfate; alkylaryl sodium sulfonates such as the alkyl benzene, toluene and naphthalene sodium sulfonates; fatty monoglyceride sulfates as sodium glyceryl monolaurate sulfate; the Igepons as "A"

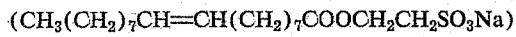

and "T"

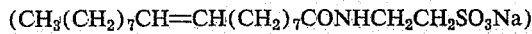

the Igepals as "C" (dodecylphenyl-polyglycolether); (2) the nonionics such as the pentaerythritol long chain mono-esters; and (3) the cationics such as lauramido-propyldimethyl benzyl ammonium chloride and the Sapamines such as N-diethylamino oleylamide hydrochloride; dry cleaning detergents or agents such as naphtha, trichlorethylene, perchlorethylene, carbon tetrachloride, Stoddard's solvent, etc.

The following formulations are set forth to illustrate but not limit the application of the anti-soil redeposition agent of the present invention:

FORMULATION NO. 1

|  | Range, pts. by wt. | Specific pts. by wt. |
| --- | --- | --- |
| Soap (commercial sodium stearate) | 20-95 | 65 |
| Soda ash | 0-20 | 14 |
| Tetrasodium pyrophosphate | 0-20 | 5 |
| Sodium silicate | 0-20 | 3 |
| Polyvinyloxazolidone (M.W., ca. 900) | 0.5-20 | 13 |

FORMULATION NO. 2

|  | Range, pts. by wt. | Specific pts. by wt. |
| --- | --- | --- |
| Synthetic detergent (alkylaryl sulfonate) | 10-95 | 70 |
| Tetrasodium pyrophosphate | 0-30 | 20 |
| Sodium silicate | 0-30 | 5 |
| Polyvinyloxazolidone (M.W., ca. 4600) | 0.5-20 | 5 |

FORMULATION NO. 3

|  | Range, pts. by wt. | Specific pts. by wt. |
| --- | --- | --- |
| Tall oil plus ethylene oxide | 5-25 | 20 |
| Tetrasodium pyrophosphate | 0-30 | 25 |
| Sodium tripolyphosphate | 0-30 | 25 |
| Sodium silicate | 0-30 | 29 |
| Polyvinyloxazolidone | 0.5-20 | 1 |

FORMULATION NO. 4

|  | Range, pts. by wt. | Specific pts. by wt. |
| --- | --- | --- |
| Sodium lauryl sulfate | 5-35 | 30 |
| Tetrasodium pyrophosphate | 0-30 | 25 |
| Sodium tripolyphosphate | 0-30 | 28 |
| Sodium silicate | 0-30 | 15 |
| Polyvinyloxazolidone (M.W., ca. 12,800) | 0.5-20 | 2 |

FORMULATION NO. 5

|  | Range, pts. by wt. | Specific pts. by wt. |
| --- | --- | --- |
| Sodium glyceryl monolaurate sulfate | 5-35 | 30 |
| Tetrasodium pyrophosphate | 0-30 | 20 |
| Sodium tripolyphosphate | 0-30 | 25 |
| Sodium silicate | 0-30 | 22 |
| Polyvinyloxazolidone (M.W., ca. 650) | 0.5-20 | 3 |

FORMULATION NO. 6

|  | Range, pts. by wt. | Specific pts. by wt. |
| --- | --- | --- |
| Pentaerythritol monostearate | 5-25 | 20 |
| Tetrasodium pyrophosphate | 0-30 | 25 |
| Sodium tripolyphosphate | 0-30 | 25 |
| Sodium silicate | 0-30 | 24 |
| Polyvinyloxazolidone (M.W., ca. 2,400) | 0.5-20 | 6 |

FORMULATION NO. 7

|  | Range, pts. by wt. | Specific pts. by wt. |
| --- | --- | --- |
| Dodecyl phenyl polyglycol ether | 5-35 | 20 |
| Tetrasodium pyrophosphate | 0-30 | 15 |
| Sodium tripolyphosphate | 0-30 | 25 |
| Sodium silicate | 0-30 | 30 |
| Polyvinyloxazolidone (M.W., ca. 4,000) | 0.5-20 | 10 |

FORMULATION NO. 8

|  | Range, pts. by wt. | Specific pts. by wt. |
| --- | --- | --- |
| Lauramidopropyldimethyl benzylammonium chloride | 5-25 | 25 |
| Tetrasodium pyrophosphate | 0-30 | 20 |
| Sodium tripolyphosphate | 0-30 | 25 |
| Sodium silicate | 0-30 | 25 |
| Polyvinyloxazolidone | 0.5-20 | 5 |

FORMULATION NO. 9

|  | Range, pts. by wt. | Specific pts. by wt. |
|---|---|---|
| Soap (commercial sodium stearate) | 20-95 | 95 |
| Polyvinyloxazolidone (M.W., ca. 600) | 0.5-20 | 5 |

FORMULATION NO. 10

|  | Range, pts. by wt. | Specific pts. by wt. |
|---|---|---|
| Soap (commercial sodium stearate) | 20-95 | 75 |
| Soda ash | 0-20 | 2 |
| Tetrasodium pyrophosphate | 0-20 | 3 |
| Polyvinyloxazolidone (M.W., ca. 500) | 0.5-20 | 20 |

FORMULATION NO. 11

|  | Range, pts. by wt. | Specific pts. by wt. |
|---|---|---|
| Sodium Dioctyl Sulfosuccinate | 0.1-3 | 1 |
| Stoddard Solvent | 91-99 | 95.95 |
| Water | 0-6 | 3 |
| Polyvinyloxazolidone | 0.01-0.5 | 0.05 |

FORMULATION NO. 12

|  | Range, pts. by wt. | Specific pts. by wt. |
|---|---|---|
| Sodium Dioctyl Sulfosuccinate | 1-5 |  |
| Perchlorethylene | 95-99 |  |
| Water | 0.05-0.2 |  |
| Polyvinyloxazoliodone | 0.01-0.3 |  |

The anti-soil redeposition properties of polyvinyloxazolidone were determined and compared to a control (containing no inhibitor) and to carboxymethylcellulose ( a known inhibitor) using the Launder-Ometer standard laboratory washing machine approved by the American Association of Textile Chemists and Colorists in all tests under similar conditions. Reflectances (G. E. recording spectrophotometer at 600 mu) were carried out on 80 ×80 unsoiled cotton fabrics washed in a solution of 0.1% soap, 0.1% sodium carbonate and 0.005% of the indicated anti-soil redeposition agent.

| Anti-soil redeposition agent | Fabrics changed but solution used over | | |
|---|---|---|---|
|  | 1st set of fabrics washed | 2nd set of fabrics washed | 6th set of fabrics washed |
| None (control) | 33.3 | 34.2 | 35.6 |
| Polyvinyloxazolidone, med. M. W.[1] | 67.3 | 61.9 | 62.1 |
| CMC, med. visc | 60.2 | 66.9 | 59.0 |
| None (control) | 25.3 |  |  |
| Polyvinyloxazolidone, low M. W.[2] | 58.3 |  |  |
| CMC, low visc | 47.0 |  |  |

[1] Medium M. W.—5,000 approx. (micro-isopiestic).
[2] Low M. W.—1,250 approx. (micro-isopiestic).

The low viscosity carboxymethylcellulose was identifiable as having a viscosity of 15-40 centipoises at 25° C. (2% water solution); whereas the medium viscosity had a viscosity of 200-700 centipoises under similar conditions.

The standard Launder-Ometer tests were repeated, using procedures as defined above with 0.1% Nacconol NR (sodium alkyl aryl sulfonate, refined) and 0.1% soda ash as a control and 0.1% Nacconol NR, 0.1% soda ash and 0.005% very low molecular weight polyvinyloxazolidone as the sample representing the composition of the present invention. The reflectances were recorded as follows:

Control:
7.7
7.7
7.6
7.7

With soil redeposition inhibitor:
61.9
59.4
55.4
58.2

Although several specific examples of the inventive concept have been described, the same should not be construed as limited thereby nor to the specific substances mentioned therein but to include various other compounds of equivalent constitution as set forth in the claims appended hereto. It is understood that any suitable changes, modifications and variations may be made without departing from the spirit and scope of the invention.

I claim:

1. A detergent composition capable of preventing redeposition of soil in the cleaning of fabrics comprising from about 5 to about 95 parts by weight of a water-soluble organic detergent selected from the group consisting of fatty acid soap and synthetic organic non-soap detergents and, as a soil redeposition inhibitor, from about 0.2 to about 20 parts by weight of a polyvinyloxazolidone having a molecular weight of at least 200.

2. A composition according to claim 1 wherein the molecular weight of the polyvinyloxazolidone is at least 1250.

3. A detergent composition according to claim 2 wherein the water-soluble organic detergent is sodium stearate.

4. A detergent composition capable of preventing redeposition of soil in the cleaning of fabrics comprising from about 5 to about 95 parts by weight of a water-soluble organic detergent selected from the group consisting of fatty acid soap and synthetic organic non- soap detergents, about 1 to 80 parts by weight of an inorganic salt selected from the group consisting of sodium carbonates, sodium polyphosphates and sodium silicates and, as a soil redeposition inhibitor, from about 0.5 to 20 parts by weight of a polyvinyloxazolidone having a molecular weight of at least 200.

5. A detergent composition according to claim 4 wherein the molecular weight of the polyvinyloxazolidone is at least 1250.

6. A detergent composition according to claim 5 wherein the water-soluble organic detergent is sodium stearate.

References Cited in the file of this patent

UNITED STATES PATENTS

| 2,566,501 | Smith | Sept. 4, 1951 |
| 2,755,252 | Fong et al. | July 17, 1956 |

OTHER REFERENCES

American Dyestuff Reporter, Feb. 1, 1954, pages P72 and P73.

UNITED STATES PATENT OFFICE
CERTIFICATE OF CORRECTION

February 17, 1959

Patent No. 2,874,124

Emil A. Vitalis

It is hereby certified that error appears in the printed specification of the above numbered patent requiring correction and that the said Letters Patent should read as corrected below.

Column 2, line 53, for "-($\beta$-hydroethyl)-" read -- -($\beta$-hydroxyethyl)- --; column 4, line 62, for "clored" read -- colored --.

Signed and sealed this 9th day of June 1959.

(SEAL)
Attest:

KARL H. AXLINE
Attesting Officer

ROBERT C. WATSON
Commissioner of Patents